Jan. 2, 1934.   W. E. URSCHEL   1,942,011
MECHANICAL MOVEMENT
Filed Jan. 27, 1932   4 Sheets-Sheet 1

INVENTOR.
William E. Urschel
BY
ATTORNEY.

Jan. 2, 1934.     W. E. URSCHEL     1,942,011
MECHANICAL MOVEMENT
Filed Jan. 27, 1932     4 Sheets-Sheet 2

INVENTOR.
William E Urschel
BY
ATTORNEY.

Jan. 2, 1934. W. E. URSCHEL 1,942,011
MECHANICAL MOVEMENT
Filed Jan. 27, 1932 4 Sheets-Sheet 3
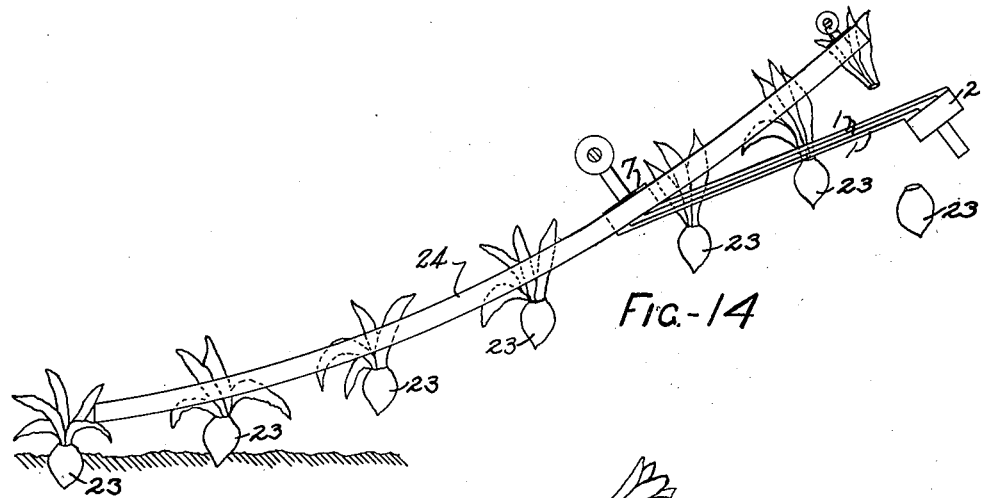
Fig.-14
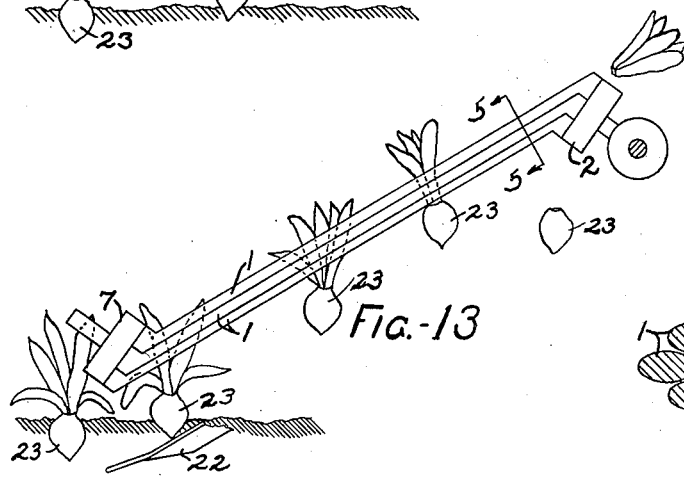
Fig.-13
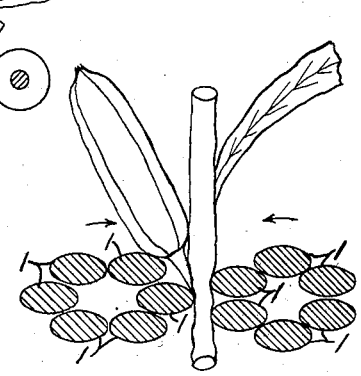
Fig.-12
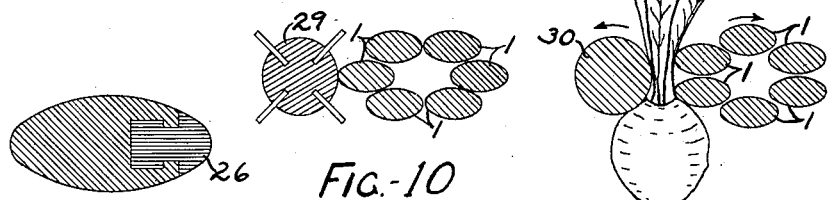
Fig.-10
Fig.-8
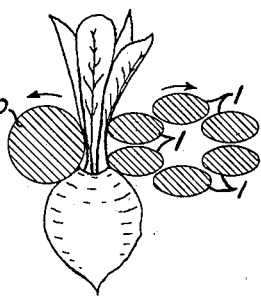
Fig.-11
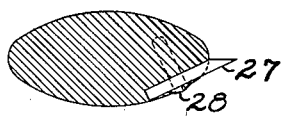
Fig.-9
INVENTOR.
William E. Urschel
BY
ATTORNEY.

Patented Jan. 2, 1934

1,942,011

UNITED STATES PATENT OFFICE 1,942,011

MECHANICAL MOVEMENT

William E. Urschel, Valparaiso, Ind.

Application January 27, 1932. Serial No. 589,209

18 Claims. (Cl. 55—66)

This invention relates to a mechanical movement involving the action of oppositely and complementarily disposed sets of offset bars secured at each end to angularly positioned bearing blocks in a radial manner. Each set of bearing blocks revolves in opposite direction creating a like difference in the direction of the movement of each set of bars.

Included in the objects of the invention are the following:

Novel means for lifting an article having appendages.

Unique means for conveying an object having an appendage along a predetermined path.

New means for positioning an object as it approaches cutting or other instrumentalities.

Means for removing the appendages from the article held in the present invention.

A new and improved means for removing cotton and like crops from the contton plant.

A novel means for removing and husking individual ears from corn stalks and similar crops.

A new means for harvesting corn and like stalk crops and severing the root appendages therefrom.

Novel means for gathering many other crops.

Many additional objects will be apparent upon reference to the accompanying specification and to the accompanying drawings in which:

Figure 8 is a section of a bar with a rubber or other soft material inset along one of its edges.

Figure 9 is a section of a bar with a knife member at one of its edges.

Figure 10 is a section of a set of bars and a pegged roll.

Figure 11 is a section of a set of bars with a plain roll.

Figure 12 is a section of bars taken on the line 12—12 in Figure 18 looking in the direction indicated by arrows.

Figure 13 is a side elevation illustrating the removing of root crops from the soil and separating the appendages from the root portion of the crop by the present invention.

Figure 14 is a side elevation of a device embodying the invention as used to separate appendages from a root crop in conjunction with a system of elevating belts in a harvesting machine.

Like reference characters are used to designate similar parts in the drawings and in the description to follow.

Figure 2:
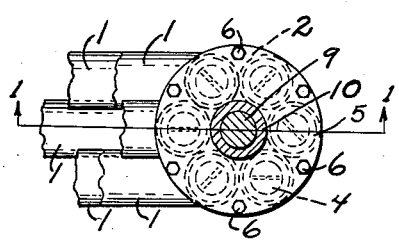
Figure 2 is a partial plan view of one of the bearing blocks with the bars attached.
Figure 1:
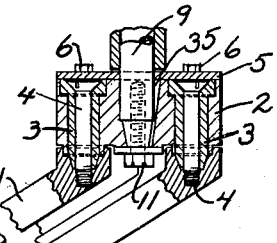
Figure 1 is a side elevation of one set of bars with a partial section of the bearing blocks taken on the line 1—1 of Figure 2 looking in direction indicated by arrows.
Figure 4:
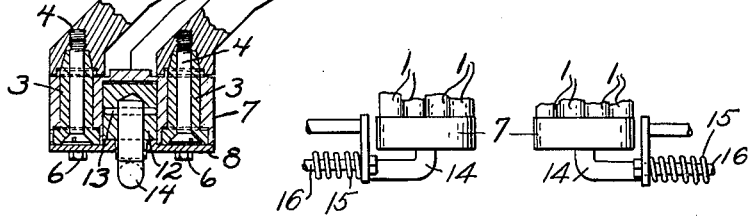
Figure 4 is an end elevation of the bar bearing blocks.

Reference should now be had more particularly to the drawings and at this time principally to Figures 1, 2, and 4. The numeral 1 designates the bars forming the subject matter of this invention. Bars 1 are journaled in the parallel faces of bearings 2 and 7 by means of extended bearing pins 3 journalled in the said bearings 2 and 7 and attached to the bars 1 by means of machine screws 4. The screws or bolts 4 virtually form end sections of said bars that are normal to said faces. The bodies of the elongated members 1, between such end sections, are out of alinement with the axes of rotation of the bearing blocks 2 and 7. To protect the bearings in the blocks 2 from dirt and other foreign substances a cover plate 5 secured to the said bearing block 2 by means of capscrews 6 may be used. For the same purpose cover plate 8 has been provided for bearings 7, being attached to said bearing blocks 7 by means of cap screws 6. Hereinafter the bearing blocks 2 will be designated as the driving bearing blocks and the bearing blocks 7 as the driven bearing blocks.

It is to be noted that bearing blocks 2 and 7 have parallel axes of rotation. Means for driving the bearing blocks 2 is provided by shafts 9 journalled in bearings 10 and secured to the said bearing blocks 2 by means of keys 35 and the cap screws 11. The bearing blocks 7 are rotatably mounted upon the bearing members 12 which in turn are pivotally mounted upon the reciprocating support arms 14 by means of pins 13.

Springs 15 (see Figure 4) are resiliently mounted upon the spring rods 16 fixed at one end in suitable brackets (not shown) and reciprocably mounted upon the supports 14. The resilient tension of springs 15 upon the reciprocating arms 14 allow the rear ends of the two sets of bars 1 to move transversely to compensate for any change in bulk of material passing through the sets of bars or to prevent injury to the bars by any hard foreign object that might become wedged between the two series of bars.

Figure 3:
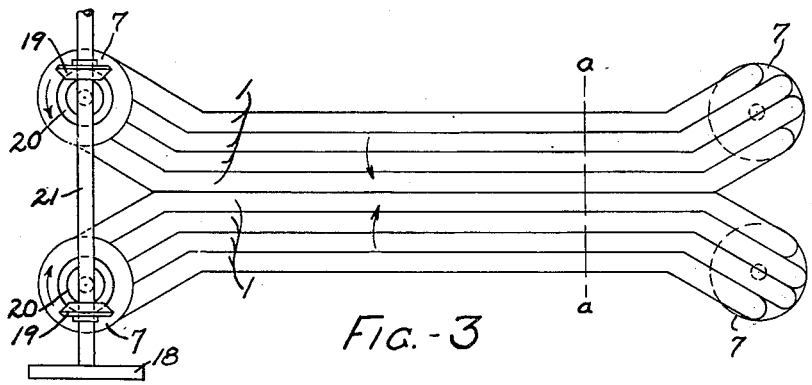
Figure 3 is a plan view of one form of the invention illustrating a simple drive therefor.
Figure 5:
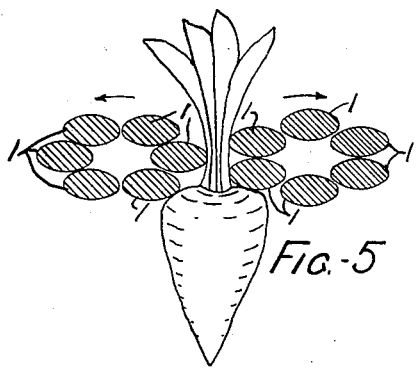
Figure 5 is a section of the bars taken on line 5—5 of Figure 13.

The tension in springs 15 may be adjusted by means of nuts 17. Reference should again be had to Figures 1 and 3. A simple drive for the bars there shown may consist of a drive pulley 18 secured in a conventional manner to shaft 21, which in turn is journalled in suitable bearings not shown.

Keyed to shaft 21 are two bevel gears 19 meshing with bevel gears 20 in such manner as to produce opposite rotation of the said bevel gears 20. The bevel gears 20 are secured to the drive shaft 9 journalled in bearing 10, said shafts 9 being secured to bearing blocks 2 in a heretofore mentioned manner.

Due to the off-set relation of the bearing blocks 2 and 7, it can be readily seen that in a plane at right angles to the bars 1 intersecting at the line a—a (see Figure 3) the said bars travel in an elliptical path the dimensions of the major and minor axes of these said paths depending on the degree of inclination of the bearing blocks 2 and 7.

By rotating the bearing blocks 2 and 7 in each series of the sets of bars 1 in opposite directions, the bars in each series travel around their respective transversely opposed paths in opposite direction. Although the said bars travel in an elliptical path, they do not rotate but have an action similar to that of the carriages in a common type of amusement machine known as the "Ferris wheel". The elliptical movement to the bars is had inasmuch as the end sections of the bar-like members 1 are parallel to the axes of rotation of the bearing blocks and the intermediate portions of said bar-like members are disposed angularly to said axes of rotation; that is, the bearing blocks have axes of revolution at an oblique angle to the axes of the bars thereon.

The two sets of bars 1 are oppositely and complementally disposed. Therefore, when set in motion they will tend to draw any object placed between the two sets of bars 1 upward or force the object downward according to the direction of the rotation of the bearing blocks 2 and 7.

Referring again to Figure 3, it can be readily understood that the rotation of the bearing blocks 2 produces a longitudinal movement in the bars 1, the movement being toward the bearing blocks 2 during the first half of the revolution of bearing blocks 2 or vice versa according to the direction of the revolution of the bearing blocks 2.

Owing to the opposite direction of the bearing blocks 2 in the two sets of bars 1, the said bars 1 in each set travel in the same longitudinal direction while in contiguous relation with each other. In this manner the two sets of bars provide a means for conveying material in both a vertical and longitudinal direction simultaneously.

When using the two sets of bars 1 as a means of harvesting root crops with the aid of a lifter or plow, (see Figure 13) the appendages of the root crop 23 are engaged between the two sets of bars 1 which produce an upward and lateral movement to the root crop 23 which has been urged from the embodying soil by the plow or lifter 22. The root crop 23 continues to travel upward and rearwardly until the body of the root of the crop comes in contact with the lowermost sections of the contiguous bars 1. Owing to the bulky nature of the root it cannot pass between the two sets of bars 1, so the appendages passing through are separated from the root and the said root drops back to the ground or into a suitable conveyor provided for that purpose.

Figure 15:
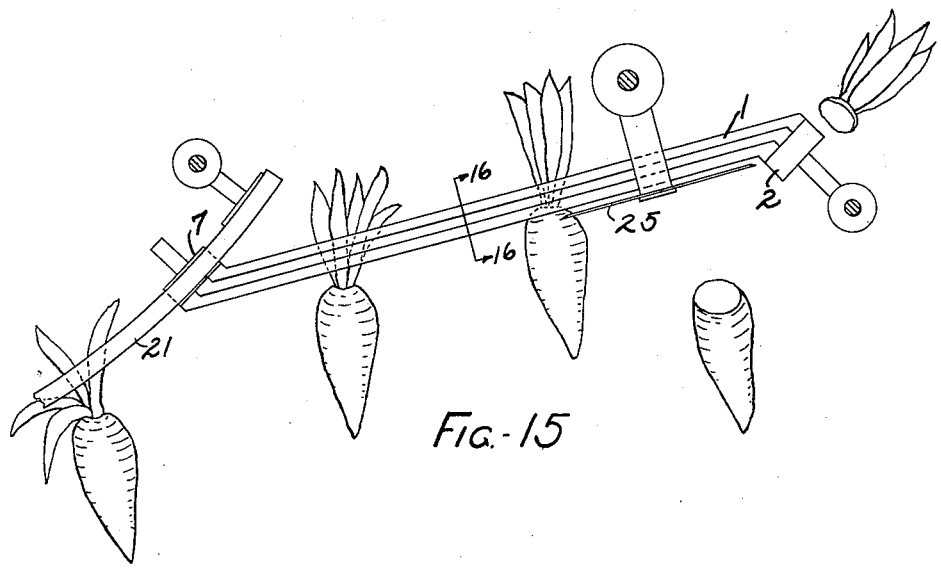
Figure 15 is a side elevation illustrating the positioning of a root crop preparatory to being acted upon by cutting or other instrumentalities embodying the invention.
Figure 16:
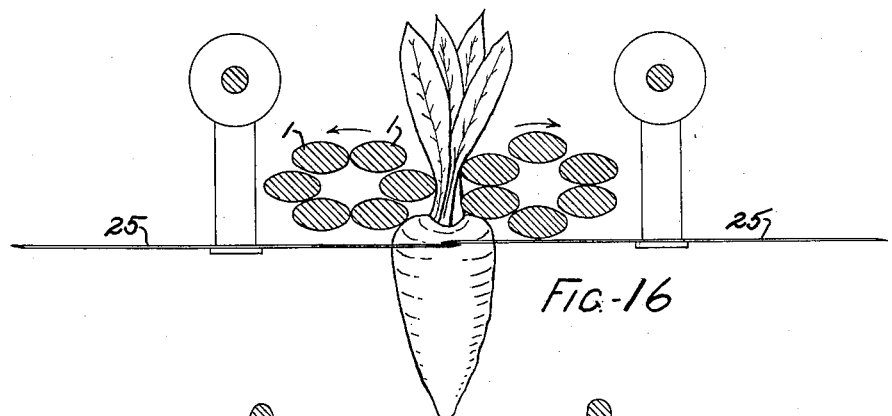
Figure 16 is a section taken on line 16—16 in Figure 15 looking in the direction indicated by arrows.

The two sets of bars may be used in a harvesting machine in conjunction with two sets of conveyor belts 24 (see Figure 14) to convey the harvested root crop 23 rearwardly and separate the appendages in a manner just heretofore described. In the harvesting of root crops, such as sugar beets, it is desirable to remove a certain portion of the top part of the body of the beet because of its low sugar content. In a harvesting machine for such above mentioned crops, as sugar beets, the two sets of bars 1 may be used in conjunction with a set of endless belts 24 (see Figure 15) to receive the root crop therefrom and convey it to cutting instrumentalities 25 at the same time positioning it in a manner favorable to be acted upon by these cutting instrumentalities. The appendages of the crop are engaged between the two sets of bars and lifted upwardly and conveyed rearwardly until the body of the root of the crop comes in contact with the lowermost sections of the contiguous sets of bars. Then the body of the root is conveyed rearwardly to the cutting instrumentalities 25. All of the beets are thus presented to the cutting instrumentalities with the tops of their root portion in the same plane, due to the fact that the two sets of bars are so spaced as to create only enough pulling effect on the crop to permit it to be drawn upwardly but not sufficient to break the appendages as is the practice in harvesting other root crops. In this manner the vertical pulling action of the bars is just enough to hold the tops of the bodies of the sugar beets in the same plane in close proximity to the lower portions of the contiguous sets of bars while the lateral conveying action presents the said sugar beets to the cutting instrumentalities 25 while held in the above mentioned manner insuring an even cut on each beet. The amount of the cut is regulated by a predetermined setting of the cutting instrumentalities.

Figure 17:
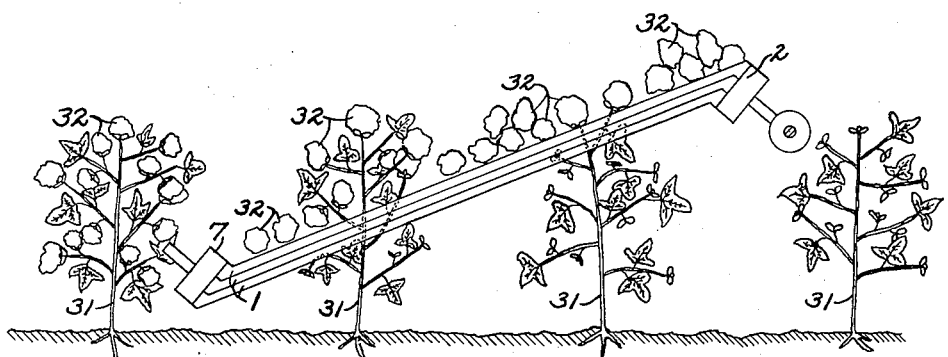
Figure 17 is a side elevation showing a device embodying the invention as used to harvest cotton and like plants.

The utility of the invention is not restricted to root crops but may be used for harvesting cotton and like crops (see Figure 17). When the two sets of bars move forward, the plant 31 is grasped between the two contiguous opposed bars and pulled downward between them. Thus the mature bolls 32 from the plant are pulled from the plant but the leaves and unmatured bolls are allowed to pass through without damage thereto. This action is helped by using bars with rubber or other resilient material insets 26 as in the bars as shown in Figure 8. The downward pulling effect of the two sets of bars is accomplished by reversing the direction of rotation of the bearing blocks 2 and 7 opposite to the direction maintained when harvesting root crops. Instead of using two sets of bars, a pegged roller 29 and one set of bars may be used as a picking unit in a harvesting machine as shown in Figure 10.

Figure 18:
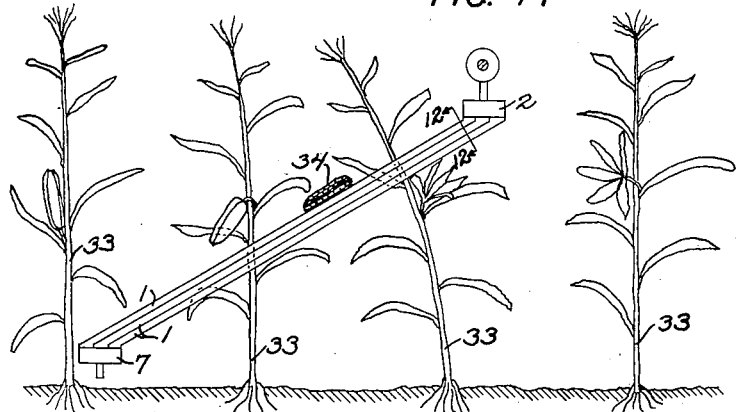
Figure 18 is a side elevation illustrating a form of the invention used to harvest and husk ears of corn.

Two sets of bars may also be used for removing and husking ears of corn as shown in Figure 18. As the two sets of bars move forwardly the stalk 33 is grasped and pulled downward between them, stripping the ear 34 from the stalk 33, leaving all or most of the husk on the stalk. Any remaining husk that has been left on the ear stripped from the stalk is pulled downward between the bars and stripped from the ear because the bulk of the ear does not permit the ear to pass down between the two sets of bars.

Figure 20:
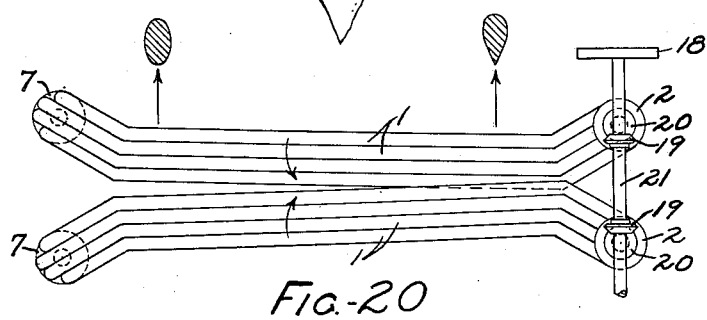
Figure 20 is a plan view of the bars used in Figure 19.
Figure 7:
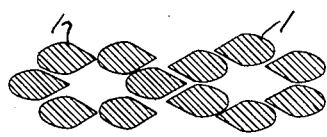
Figure 7 is a section of bars with one side of the bars shaped to form cutting edges.
Figure 19:
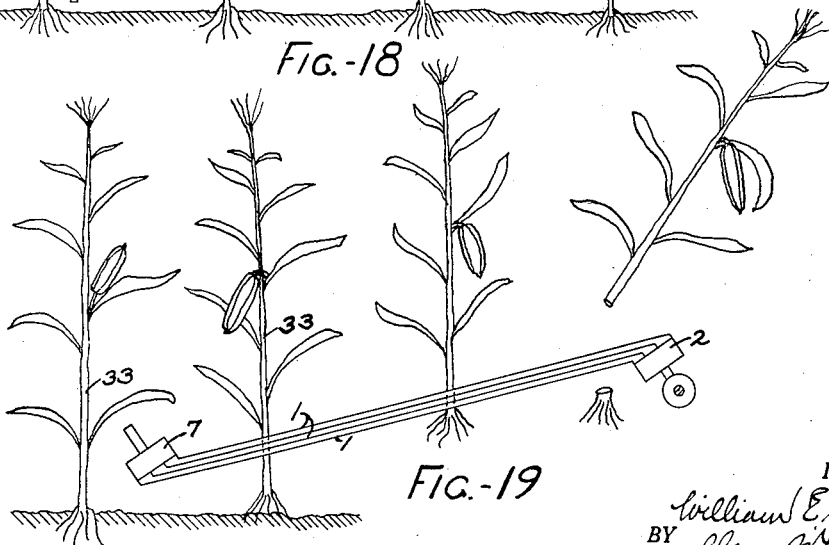
Figure 19 is a side elevation of an embodiment of the invention as used to harvest corn and like stalk crops and severing the root appendages therefrom.

Two sets of bars may be used to harvest corn and like stalk crops as shown in Figures 19 and 20. The forward ends of the bars used are smooth edged while the rear of the bars are shaped in a manner as to provide cutting edges. As the two sets of bars move forwardly, the stalk of corn 33 or other like crop is grasped between the two sets of contiguous bars and urged upward and rearwardly with its root appendages attached until it reaches the portion of the bars with cutting edges where the root portion is severed from the stalk and falls back to the ground while the stalks are acted upon by a suitable binding apparatus (not shown). Instead of forming cutting edges on bars 1, as shown in Figure 7, a cutting member 27, (see Figure 9) may be attached to said bars by means of screws 28.

Figure 6:
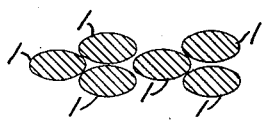
Figure 6 is a section of a set of bars using three bars on each bearing block.

Although two sets of bars have been used in most of the material hereinabove, the invention is not limited to such an arrangement, for one set of bars may be used with different types of rollers as shown in Figures 10 and 11. A majority of the figures in the drawings show each set of bars as comprising six bar sections but any number of bars may be used as shown in Figure 6 where three bars only are used.

What I claim is new and desire to secure by Letters Patent in the United States is:

1. Pairs of bearing means arranged in spaced relation and for opposite rotation, and members intermediate the similarly rotating members, said members being divided into two series traveling in transversely opposed paths, and the members in each series traversing a common path.

2. Opposed bearing means in spaced relation, the faces of said members being parallel, and members extending from one face to the other at an angle to said faces, said members being divided into two series traveling in transversely opposed paths.

3. Opposed bearing means in spaced relation, said members having faces in parallelism, and elongated members intermediate said bearing means, said elongated members being generally angular to said faces and having a section thereof normal to said faces, said members being divided into two series traveling in transversely opposed paths.

4. A new mechanical movement for harvesters and the like comprising opposed bearing members having parallel axes of rotation, and bars or the like intermediate said bearing members at an oblique angle to the axes of their rotation, said bars being divided into two series traveling in transversely opposed paths.

5. In combination, opposed bearing members having axes of rotation in parallelism but offset one from another, and bar like members therebetween, said bar-like members being divided into two series traveling in transversely opposed paths.

6. In combination, opposed bearing members having parallel axes of rotation, and bars extending from one bearing to the other, each bar having a body out of alignment with said axes of rotation, said bars being divided into two series traveling in transversely opposed paths and the bars in each series traversing a common path.

7. In combination, opposed bearing members having parallel axes of rotation, and bar like members therebetween, the end sections of said bar like members being parallel to such axes of rotation and the intermediate portions of said bar like members being angularly disposed to said axes of rotation, said bars being divided into two series traveling in transversely opposed paths.

8. Series of members in opposed relation, and means for moving said members in opposed elliptical paths while maintaining said members against rotation, the bars in each series traversing a common path.

9. Bar like members arranged in pairs of opposed series, and means for moving the bars of said opposed series in opposed elliptical paths while maintaining the individual series against axial and longitudinal displacement, the bars in each series traversing a common path.

10. Oppositely arranged series of elongated members, and means for moving members of opposed series toward and away from one another while maintaining said series against axial and longitudinal displacement, the bars in each series moving in a common continuous path.

11. Crop gathering instrumentalities comprising elongated crop engaging members arranged in opposed series, and means for moving opposed members in opposed elliptical paths while maintaining said series against axial and longitudinal displacement, the elongated members of each series traversing a common path.

12. Crop gathering instrumentalities comprising elongated crop engaging members arranged in opposed series, and bearing blocks for said opposed series of members each having an axis of rotation at an oblique angle to the general direction of the bodies of said elongated members.

13. Crop gathering instrumentalities comprising elongated crop engaging members arranged in opposed series, and paired bearing blocks for each of said series, the axes of rotation for said blocks being at an oblique angle to the bodies of said elongated members, and the members of the opposed series being non-parallel.

14. Crop treating apparatus comprising bearing blocks arranged in pairs and spaced apart, the axes of revolution of all of said blocks being parallel and the members of one pair of bearing blocks being separated a greater distance than the members of the other pair, and crop engaging members between said bearing blocks and having axes at an oblique angle to the axes of said bearing blocks.

15. Series of bars in pairs, and bearing blocks for said bars having axes of revolution at an angle to the axes of said bars, there being between each of said bars and the bearing blocks therefor a mounting admitting of displacement of said bars to compensate for stresses applied thereto.

16. Crop gathering instrumentalities comprising elongated crop engaging members arranged in opposed series, and means for moving the individual members in each series both axially and transversely to describe an elliptical path, the movement in said series being in opposite directions, and the indivdual members in each series traversing a common path.

17. Crop gathering instrumentalities comprising elongated crop engaging members arranged in opposed series to compress a section of such crop therebetween for the support thereof, each of said series moving about an axis in substantial parallelism to said bars, and means imparting a movement to said bars about the axis in their respective series whereby said crop is advanced longitudinally of such axes.

18. Crop gathering instrumentalities comprising elongated crop engaging members arranged in opposed series to compress and support a section of such crop therebetween, the bars in each series moving about the longitudinal axis of such series, and means imparting a movement to said bars about said axis in their respective series whereby the engaged crop is advanced both transversely and laterally of said axis.

WILLIAM E. URSCHEL.